United States Patent
Debras

(10) Patent No.: US 6,245,867 B1
(45) Date of Patent: Jun. 12, 2001

(54) POLYMERIZATION OF POLYETHYLENE

(75) Inventor: Guy Debras, Frasnes lez Gosselies (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/537,152

(22) Filed: Mar. 29, 2000

(30) Foreign Application Priority Data

Mar. 29, 1999 (BE) .................................................. 99106377

(51) Int. Cl.[7] ........................................................ C08F 2/06
(52) U.S. Cl. ................................ 526/65; 526/64; 526/73; 526/106; 526/348.5
(58) Field of Search .................. 526/64, 65, 73, 526/106, 348.5

(56) References Cited

U.S. PATENT DOCUMENTS 6,063,878 * 5/2000 Debras et al. .......................... 526/69

FOREIGN PATENT DOCUMENTS

| 197 23 003 | 12/1998 | (DE) . |
| 0739909 | 10/1996 | (EP) . |
| 0832905 | 4/1998 | (EP) . |
| 9732905 | 9/1997 | (WO) . |

* cited by examiner

*Primary Examiner*—David W. Wu
*Assistant Examiner*—William Cheung
(74) *Attorney, Agent, or Firm*—Jim D. Wheelington

(57) ABSTRACT

A process for producing polyethylene in a two step polymerisation process that comprises the steps of:

(a) homopolymerising ethylene in the presence of a first catalyst comprising an activated chromium catalyst in a first reactor to produce a first polyethylene fraction;

(b) transferring the first polyethylene fraction produced in the first reactor and at least a portion of the first catalyst to a second reactor;

(c) in the second reactor homopolymerising ethylene or copolymerising ethylene and an alpha-olefinic comonomer having from 3 to 10 carbon atoms in the presence of a second catalyst under conditions which suppress residual activity in the first catalyst to produce a second polyethylene fraction; and (d) retrieving from the second reactor polyethylene comprising a blend of the first and second polyethylene fractions.

10 Claims, No Drawings

POLYMERIZATION OF POLYETHYLENE

BACKGROUND TO THE INVENTION

The present invention relates to the polymerisation of ethylene using at least two independent catalysts.

DESCRIPTION OF THE PRIOR ART

Various techniques have been employed in the past for the polymerisation of polymers and copolymers of olefins. One of the approaches has involved employing catalysts based upon transition metal compounds such as titanium. Another approach has involved the employment of catalysts containing chromium. As a general rule, these two types of catalysts produce polyolefins having somewhat different physical characteristics. For some applications, it is desirable to have polyolefins which have a blend of the properties that are produced by the titanium and the chromium catalysts. For example, it may be desirable to obtain polyolefins with a broad or bimodal molecular weight distribution in order to combine the advantages of the low molecular weight polyolefins such as good processability and high melt index, and those of the high molecular weight polyolefins, such as good physical properties.

The molecular weight distribution can be completely defined by means of a curve obtained by gel permeation chromatography. Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. For most applications, the dispersion index varies between 10 and 30.

Some techniques for preparing broad molecular weight polymers have involved the use of multiple reactor arrangements, sometimes loops, sometimes stirred tanks in which different polymerisation conditions such as temperature, hydrogen, or comonomer are employed in the different reaction zones. Such multiple reactor schemes, while offering versatility in resin characteristics, are not particularly efficient. In addition, the control of the multiple reactor schemes is difficult.

Another technique which has been used to broaden the molecular weight distribution involves the physical blend, in an extruder, of polyolefin resins having different properties.

In addition, some attempts have been made to combine titanium and chromium either on a single catalyst, as disclosed for example in U.S. Pat. No. 3,622,521, U.S. Pat. No. 4,041,224, and EP-A-0,480,376, or as two different supported catalysts such as disclosed for example in U.S. Pat. No. 4,285,834, U.S. Pat. No. 5,237,025 and U.S. Pat. No. 5,330,950 which discloses a mixture of Ziegler-Natta and chromium catalysts for making bimodal or broad molecular weight distribution high density polyethylenes.

However, the polymers obtained with the above mentioned processes do not exhibit the desired good processing and mechanical properties together with a high catalyst activity.

WO-A-97/32905 discloses a method for transitions between two different catalysts in olefin polymerisations. First and second catalysts are successively introduced into a polymerisation reactor and a transition is performed between a chromium-based catalyst and a metallocene catalyst. This method suffers from the problem of the existence of a transition period between the two catalysts which, although shortened as compared to the background art discussed in the specification, nevertheless is still undesirable. The specification discloses that a direct transition between chromium oxide-based catalysts and metallocene catalysts in olefin polymerisation normally is difficult.

EP-A-0832905 discloses a process for the preparation of polyethylene having a large molecular weight distribution in which a single chromium-based catalyst is employed in two reactors in series, ethylene and the chromium catalyst being introduced into the first reactor at a temperature from 95 to 110° C. and the ethylene homopolymer thereby obtained is transferred into the second reactor with added ethylene and optionally an alpha-olefinic comonomer at a temperature of 80 to 90° C.

EP-A-0739909 discloses a number of processes for the production of ethylene polymer. In a first process ethylene is polymerised optionally with one or more comonomers in two reactors in series in the presence of a solid catalyst comprising titanium and zirconium in a molar ratio of at least 2 together with a cocatalyst. No chromium-based catalyst is employed. In a second process the ethylene homopolymerisation or copolymerisation is carried out in two reactors in series in the presence of a first catalyst consisting essentially of from 10 to 30 wt % titanium, from 20 to 60 wt % halogen, from 0.5 to 20 wt % magnesium and from 0.1 to 10 wt % aluminium and a second catalyst consisting essentially of from 0.5 to 10 wt % titanium, from 5 to 40 wt % zirconium, from 20 to 80 wt % halogen, from 1 to 30 wt % magnesium and from 0.5 to 10 wt % aluminium. Again, no chromium catalyst is employed. A third process polymerises ethylene optionally with one or more comonomers in a single reactor in the presence of a chromium-based catalyst and a support consisting of at least 2 constituents chosen from silica, alumina and aluminium phosphate. A fourth process is disclosed in which ethylene is polymerised optionally with one or more comonomers in two reactors in series in the presence of a single chromium-based catalyst on a support containing at least 2 constituents chosen from silica, alumina and aluminium phosphate.

DE-A-19723003 discloses the production of polymer mixtures in which two polymers have been physically blended. One polymer may comprise an ethylene copolymer produced using a metallocene catalyst and one polymer may comprise an ethylene copolymer produced using a chromium-based or Ziegler-Natta catalyst.

SUMMARY OF THE INVENTION

It is an aim of the present invention at least partially to overcome these problems in the prior art.

The present invention provides a process for producing polyethylene in a two step polymerisation process that comprises the steps of:

(a) homopolymerising ethylene in the presence of a first catalyst comprising an activated chromium catalyst in a first reactor to produce a first polyethylene fraction;

(b) transferring the first polyethylene fraction produced in the first reactor and at least a portion of the first catalyst to a second reactor;

(c) in the second reactor homopolymerising ethylene or copolymerising ethylene and an alpha-olefinic comonomer having from 3 to 10 carbon atoms in the presence of a second catalyst under conditions which suppress residual activity in the first catalyst to produce a second polyethylene fraction; and (d) retrieving from the second reactor polyethylene comprising a blend of the first and second polyethylene fractions.

The second polyethylene fraction preferably has a narrow molecular weight distribution and higher molecular weight than the first polyethylene fraction.

The second catalyst may be a Ziegler-Natta catalyst or metallocene catalyst, and may have been precontacted with a cocatalyst, such as an organoaluminium compound.

The first and second reactors may be liquid full loop reactors, and may be connected in series by a transfer line. The homopolymer fraction is produced in the first reactor at a temperature preferably ranging from 100 to 110° C. and may have an ethylene off-gas concentration in the range of from 3 to 4% by weight, and optionally hydrogen.

The second reactor is preferably operated at a temperature of less than 85° C. so as to suppress the activity of the first chromium-based catalyst. More preferably, in the second reactor the polymerisation temperature is controlled so as to be from 65 to 80° C. and comonomer and hydrogen are added, as needed, together with any additional ethylene which may be required in order to obtain a final polyethylene of the desired density.

At the low temperature at which the second reactor is operated, the first chromium catalyst has a limited activity. At such temperatures the first catalyst produces a polyethylene exhibiting the required low melt index because the catalyst has a very poor comonomer incorporation capability. By adding to the second reactor a second catalyst, precontacted with a cocatalyst, said second catalyst optionally being either a Ziegler-Natta catalyst or a metallocene catalyst, together with comonomer, a high molecular weight copolymer of ethylene may be produced.

The chromium-based catalyst preferably comprises a chromium oxide catalyst containing, on a support, at least 2 weight % titanium, based on the weight of the catalyst.

The chromium-based catalyst preferably comprises a supported chromium oxide catalyst having a titania-containing support, for example a composite silica and titania support. A particularly preferred chromium-based catalyst may comprise from 0.5 to 5 weight % chromium, preferably around 1 weight % chromium, such as 0.9 weight % chromium based on the weight of the chromium-containing catalyst. The support comprises at least 2 weight % titanium, preferably around 2 to 3 weight % titanium, more preferably around 2.3 weight % titanium based on the weight of the chromium-containing catalyst. The chromium-based catalyst may have a specific surface area of from 200 to 700 $m^2/g$, preferably from 400 to 550 $m^2/g$ and a volume porosity of greater than 2 $cm^3/g$ preferably from 2 to 3 $cm^3/g$.

The catalyst may be subjected to an initial activation step in air at an elevated activation temperature. The activation temperature preferably ranges from 500 to 850 °C., more preferably 600 to 750° C., and is most particularly around 635° C.

When such a chromium-based catalyst is introduced into a polymerisation reactor together with an olefin, there is a delay before the chromium-based catalyst becomes active in the polymerisation process. This is because the chromium-based catalyst, which is based on chromium oxide, tends to react with the ethylene present by ethylene reduction of the chromium oxide, thereby to generate oxygen-containing organic compounds. After the initial reaction of the ethylene with the chromium oxide based catalyst, then the catalyst becomes active.

In order to remove the initial induction period, it is known to chemically reduce the chromium oxide catalyst by a process in which at least a portion of the chromium is reduced to a low valance state, prior to the polymerisation step. The chromium-based catalyst is treated in a gas-phase reactor, for example a fluidised bed, at elevated temperature, in order to activate and reduce the catalyst. The reducing agent comprises carbon monoxide or methane and the reduction is carried out at a temperature of from 250 to 500° C., more preferably 350 to 450° C., and most preferably at a temperature of around 370° C.

The Ziegler-Natta catalyst can be prepared by reacting with a reducing halide source a mixture of a hydrocarbon soluble magnesium alkyl compound, an aliphatic alcohol and a titanium compound. More particularly, the Ziegler-Natta catalyst of the present invention is prepared by a process which comprises:

(i) mixing in a hydrocarbon solvent a dialkyl magnesium compound of general formula $MgR^1R^2$ with a chlorinating agent soluble in the hydrocarbon solvent under conditions to precipitate controlledly a magnesium dichloride derivative, wherein $R^1$ and $R^2$ are each independently a $C_1$ to $C_{10}$ alkyl group preferably a $C_2$ to $C_8$ alkyl group, and the chlorinating agent is obtainable from the reaction between an alcohol of general formula $R^3OH$ and an alkyl aluminium chloride of general formula $R^4{}_nAlCl_{3-n}$, in which $R^3OH$ is a cyclic or branched $C_3$ to $C_{20}$ alcohol, each $R^4$ is independently a $C_2$ to $C_8$ alkyl and n is 1 or 2; and (ii) titanating the magnesium dichloride derivative with a chlorinated titanium compound to produce the Ziegler-Natta catalyst.

The dialkyl magnesium compound is preferably n-butyl sec-butyl magnesium or butyl ethyl magnesium although other dialkyl magnesium compounds such as butyl octyl magnesium, dibutyl magnesium and dihexyl magnesium can be used. The dialkyl magnesium derivative should be soluble in the hydrocarbon solvent used in the process.

The chlorinating agent obtainable from the reaction between the alcohol and the alkyl aluminium chloride may have the general structure $(R^3O)_nAlCl_{3-n}$, preferably $(R^3O)_2AlCl$. The alcohol is selected such that, after reaction with the alkyl aluminium chloride, the chlorinating agent product is a compound soluble in the hydrocarbon solvent used in the process. This is important for particle size and particle size distribution control. The alcohol may be 2-ethyl-1-hexanol, 2-methyl-1-pentanol, 2-ethyl-1-butanol, 2-methyl-2-propanol, 2-methyl-1-propanol, cyclopentanol or cyclohexanol, preferably 2-ethyl-1-hexanol. The preferred alkyl aluminium chloride is diethyl aluminium chloride.

The molar ratio of the alcohol to the alkyl aluminium chloride is usually from 0.5 to 2.5, preferably about 2. The molar ratio of the alkyl aluminium chloride to the dialkyl magnesium compound is usually in the range of from 0.8 to 2.2.

Other methods of making compounds of the formula $(R^3O)_nAlCl_{3-n}$ include reacting together an alkoxy aluminium derivative $Al(OR^3)_3$, such as aluminium ethoxide or isopropoxide, with a chlorinating agent, typically an acyl halide such as acetyl chloride.

Any non-aromatic hydrocarbon solvent may be used in the process although, from a practical viewpoint, it is usual for the solvent to be removed subsequently. Hydrocarbon solvents of less than 6 carbon atoms tend to boil too easily whereas hydrocarbon solvents having more than 7 carbon atoms are often difficult to remove. Accordingly, preferred hydrocarbon solvents are hexane or heptane.

In step (ii) any chlorinated titanium compound suitable for titanating the magnesium dichloride derivative may be used. Such chlorinated titanium compounds include $TiCl_4$, $TiCl_3OR^5$, $TiCl_2OR^5{}_2$, $TiClOR^5{}_3$, or mixtures thereof, in which each $R^5$ is independently a $C_2$ to $C_8$ alkyl, preferably $TiCl_4$.

A dialkyl ether may be added into the process to improve the fluff bulk density achieved during polyolefin synthesis. Preferably, the dialkyl magnesium compound is premixed in the hydrocarbon solvent with an acyclic dialkyl ether of general formula $R^5$—O—$R^6$, in which $R^5$ and $R^6$ are each independently $C_2$ to $C_{10}$ alkyl groups. Preferably, the dialkyl ether is diisoamyl ether. The molar ratio of the dialkyl magnesium compound to the dialkyl ether is preferably 1.93. The ether is used to increase the polyolefin fluff bulk density but has little or no influence on the catalyst granulometry or particle size distribution.

Turning to the general procedure for preparing the Ziegler-Natta catalyst, the dialkyl magnesium compound may be dissolved in the hydrocarbon solvent and mixed with the dialkyl ether at room temperature to form a solution. The alcohol may be added to the alkyl aluminium chloride which is dissolved in the hydrocarbon solvent to form a solution. This solution may be left at room temperature for a period of at least 0.5 hours so as to ensure that a reaction takes place between the alcohol and the alkyl aluminium chloride to form the chlorinating agent. Alternatively, the dialkyl magnesium compound and the chlorinating agent may be added to the solvent at the same time. The reaction mixture can if desired be stored under an inert atmosphere for of the order of 4 to 6 days without degradation.

The solution of the chlorinating agent, usually in the hydrocarbon solvent, is mixed rapidly with a solution of the dialkyl magnesium compound in the hydrocarbon solvent, for example by dropwise addition, so as to achieve mixing with controlled precipitation. Under these conditions, the "$MgCl_2$" precipitation proceeds very slowly and a good control of the particle size and the particle size distribution is achieved. A catalyst of poor morphology is obtained if the mixing is performed without appropriate control, for example where a solution of the dialkyl magnesium compound is added to excess chlorinating agent (i.e. in the reverse order).

The magnesium dichloride derivative is preferably aged without agitation, usually at ambient temperature in the range 20° C. to the boiling point of the hydrocarbon solvent preferably about 85° C., generally for a period in the range 1hr to 1 week, prior to titanation step (ii). Aging generally requires further heating of the magnesium dichloride derivative in suspension so as to produce a catalyst with improved morphology.

Preferably, the magnesium dichloride derivative precipitated from step (i) is washed with the hydrocarbon solvent to remove reaction by-products prior to titanation step (ii). Usually, the magnesium dichloride derivative is washed several times with the hydrocarbon solvent. This helps prevent $TiCl_3$ precipitation during the titanation step, which would otherwise result in a catalyst with poor morphology.

The titanation agent may be added dropwise, usually at room temperature to the magnesium dichloride derivative to produce the catalyst. Usually, the reaction proceeds first at room temperature then at 50° C. and finally at 98° C. The catalyst may then be washed 4 times at 60° C. with the hydrocarbon solvent. The catalyst may be used in olefin polymerisation, such as ethylene polymerisation or copolymerisation, in the form of a slurry or after drying.

Any metallocene in the art known as suitable for the polymerisation of olefins can be used in the present invention.

The metallocene catalyst is preferably a metallocene-alumoxane supported catalyst prepared as follows:
  a) reacting a metallocene with an alumoxane at a temperature of from 15 to 50° C.;
  b) recovering from step a) a mixture comprising an alkylmetallocenium cation and an anionic alumoxane oligomer;
  c) reacting the mixture from step b) with a support at a temperature of from 85 to 110° C.; and
  d) recovering a supported metallocene-alumoxane catalyst as a free flowing catalyst.

The preferred metallocenes can be represented by the general formulae:

$$(Cp)_m MR_n X_q \tag{1}$$

wherein Cp is a cyclopentadienyl ring, M is a group 4b, 5b or 6b transition metal, R is a hydrocarbyl group or hydrocarboxy having from 1 to 20 carbon atoms, X is a halocen, and m=1–3, n=0–3, q=0–3, and the sum of m+n+q is equal to the oxidation state of the metal,

$$(C_5R'_k)_g R''_s (C_5R'_k) MQ_{3-g} \tag{2}$$

or

$$R''_s (C_5R'_k)_2 MQ' \tag{3}$$

wherein $(C_5R'_k)$ is a cyclopentadienyl or substituted cyclopentadienyl, each R' being the same or different and is hydrogen or a hydrocarbyl radical such as alkyl, alkenyl, aryl or arylalkyl radical containing from 1 to 20 carbon atoms or two carbon atoms joined together to form a $C_4$–$C_6$ ring, R" is a $C_1$–$C_4$ alkylene radical, a dialkyl germanium or silicon or siloxane, or an alkyl phosphine or amine radical bridging two $(C_5R'_k)$ rings, Q is a hydrocarbyl radical such as aryl, alkyl, alkenyl, alkyl aryl or aryl alkyl radical having from 1 to 20 carbon atoms, hydrocarboxy radical having from 1 to 20 carbon atoms or halogen and can be the same or different from each other, Q' is an alkylidene radical having from 1 to 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, proyl, butyl, isobutyl, amyl, isoamyl, hexyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred. Exemplary hydrocarboxy radicals are methoxy, ethoxy, propoxy, butoxy, amyloxy and the like.

Exemplary alkylidene radicals are methylidene, ethylidene and propylidene.

Particularly preferred metallocenes for use in the present invention, are:
bisindenyl) ethane (zirconium dichloride)
bisindenyl) ethane (hafnium dichloride)
dimethylsilyl (bisindenyl) (zirconium cichloride)
isopropylidene (cyclopentadienyl fluorenyl) (zirconium dichloride)
diphenyl methylidene (cyclopentadienyl fluorenyl) (zirconium dichloride)
(biscyclopentadienyl) (zirconium dichloride)
and (bismethylcyclopentadienyl) (zirconium dichloride).

The alumoxanes known in the art can be used in the present invention.

The preferred alumoxanes comprise oligomeric linear and/or cyclic alkyl alumoxanes represented by the formula:

$$R—(Al—O)_n—AlR_2 \tag{4}$$

for oligomeric, linear alumoxanes and R

$$(Al—O)_m \tag{5}$$

for oligomeric, cyclic alumoxanes R wherein n is from 1 to 40, preferably from 10 to 20, m is from 3 to 40, preferably from 3 to 20 and R is a $C_1$–$C_8$ alkyl group and preferably methyl. Generally, in the preparation of alumoxanes from, for example, trimethyl aluminum and water, a mixture of linear and cyclic compounds is obtained.

Methylalumoxane is preferably used.

The alumoxane is usually delivered as a concentrated solution of alumoxane in toluene.

The support used in the metallocene catalyst can be selected from any organic or inorganic solids, particularly porous supports such as talc, inorganic oxides, and resinous support material such as polyolefin. Preferably, the support material is an inorganic oxide in its finely divided form.

Suitable inorganic oxide materials, which are desirably employed in accordance with this invention, include Group 2a, 3a, 4a and 4b metal oxides such as silica, alumina and mixtures thereof. Other inorganic oxides that may be employed either alone or in combination with the silica, or alumina, are magnesia, titania, zirconia, and the like. Other suitable support materials, however, can be employed, for example, finely divided functionalized polyolefins such as finely divided polyethylene.

Preferably, the support is a silica having a surface area of from 200 to 600 $m^2/g$ and a pore volume of 0.5 to 3 $cm^3/g$.

The reaction between the metallocene and the alumoxane is a multi-step equilibrium type reaction involving mono- and di-alkylation of the metallocene, mono-, di- or multi-metallic species and finally abstraction of an alkyl group, and formation of active cationic species. This reaction is performed at a temperature of from 15 to 50° C., preferably about 25° C. and is conducted in the presence of a solvent, preferably toluene. The amounts of alumoxane and metallocene can vary in order to define an aluminum to transition metal mole ratio ranging from 1:1 to 100:1, and preferably, ranging from 5:1 to 50:1. The mixture alkylmetallocenium cation-anionic alumoxane oligomer is added to the support material slurried in a suitable hydrocarbon solvent.

Preferred solvents include mineral oils and the various hydrocarbons which are liquid at the temperature and pressure conditions employed and which do not react with the individual ingredients.

The system also contains an organo-aluminium compound which acts as a cocatalyst for the second catalyst in the second reactor. The most preferred organo-aluminium cocatalyst is described by the formula $AlR_3$ where R is an alkyl of from 1 to 8 carbon atom and R may be the same or different. The most preferred cocatalyst is a trialkylaluminium, such as triisobutylaluminium (TIBAL) or triethylaluminium (TEAL).

DETAILED DESCRIPTION OF THE PREFERRED EMBODIMENTS

The present invention will now be described in greater detail with reference to the following non-limiting examples:

EXAMPLE 1

Ethylene was polymerised in a two-step procedure using a chromium catalyst in the first reactor of two serially connected liquid-full loop reactors and a Ziegler-Natta catalyst in the second reactor.

The chromium catalyst was fluorinated by 1.4 wt % $NH_4BF_4$ to provide a fluorine content of 1 wt % in the catalyst. It had a specific surface area of 500 $m^2/g$ and a pore volume of 2.3 cc/g. The catalyst support was a mixture of $SiO_2$—$TiO_2$ and the catalyst was activated at a temperature of 800° C. The chromium and titanium contents of the catalyst were, respectively, 1 and 2.4 wt %.

The Ziegler-Natta catalyst was supported Dn silica and comprised 3.26 wt % of Mg, 19.0 wt % of Cl and 1.33 wt % of Ti. The Ziegler-Natta catalyst was employed in conjunction with a cocatalyst which comprised tri-isobutyl aluminium (TIBAL).

The polymerisation conditions are summarised in Table I.

TABLE 1

| Reactor | 1 | 2 |
|---|---|---|
| Catalyst | Chromium | Ziegler-Natta |
| Polymerisation Temp (° C.) | 105 | 75 |
| C2 (wt %) | 4.6 | 0.5 |
| C6 (wt %) | 0 | 0.46 |
| H2 (Nl/h) | 0 | 0.2 |
| Fraction produced (%) | 60 | 40 |
| HLMI (g/10 min) | 107 | 9.3 |
| Density (g/cc) | 0.965 | 0.949 |
| Mn (kDa) | 15.4 | 21.7 |
| Mw (kDa) | 97 | 275 |
| Dispersion Index D | 6.3 | 12.7 |
| Amount TIBAL (ppm) | 0 | 100 |

HLMI is the high load melt index measured using the procedures of ASTM D 1238 at a temperature of 190° C.

The low molecular weight homopolymeric first fraction was produced in the first reactor with the chromium catalyst, in the absence of hydrogen and comonomer.

The temperature in the second reactor was 75° C. At such a low temperature, the Cr catalyst had no significant activity.

EXAMPLE 2

Ethylene was polymerised in a two-step procedure using a chromium catalyst in the first reactor of two serially connected liquid-full loop reactors and a metallocene catalyst in the second reactor.

The same fluorinated chromium catalyst as Example 1 was employed, but the catalyst was additionally CO reduced at a temperature of 370° C. and activated at a lower temperature of 650° C. The metallocene catalyst was $(Ph_2C)(Me_3SiCp)FluZrCl_2$ on a $SiO_2$ support, said support being treated with methalyalumoxane (MAO) in an amount of 6 wt %.

The polymerisation conditions are summarised in Table II.

TABLE II

| Reactor | 1 | 2 |
|---|---|---|
| catalyst | Chromium | Metallocene |
| Polymerisation Temp (° C.) | 106 | 70 |
| C2 (wt %) | 6 | 6 |
| C6 (wt %) | 0 | 6.8 |
| H2 (Nl/h) | 0 | 0 |
| Fraction produced (%) | 60 | 40 |
| HLMI (g/10 min) | 81 | 7.8 |
| Density (g/cc) | 0.964 | 0.940 |
| Mn (kDa) | 19 | 30 |
| Mw (kDa) | 144 | 251 |
| Dispersion Index D | 7.6 | 8.4 |
| Amount TIBAL (ppm) | 0 | 50 |

The chromium catalyst was prereduced in order to prevent the production of oxygenates generated by $CrO_3$; they are poisonous for the metallocene catalyst. The melt index was boosted by fluorination and the high activation temperature of 650° C. The molecular weight distribution was narrowed by fluorination and by the $SiO_2$ support of the chromium-based catalyst.

The metallocene catalyst had a structure that produced a high molecular weight, low density polyethylene.

For each of the Examples, the Ziegler-Natta or metallocene catalyst present in the second reactor can provide a narrow molecular weight distribution for the second polyethylene fraction having high molecular weight. This is due to a high degree of comonomer incorporation in the high molecular weight fraction, yielding good mechanical properties for the combined resin blend. The combined resin blend may have a bimodal molecular weight distribution.

What is claimed is:

1. A process for producing polyethylene in a two step polymerisation process that comprises the steps of:
   (a) homopolymerising ethylene in the presence of a first catalyst comprising an activated chromium catalyst in a first reactor to produce a first polyethylene fraction;
   (b) transferring the first polyethylene fraction produced in the first reactor and at least a portion of the first catalyst to a second reactor;
   (c) in the second reactor homopolymerising ethylene or copolymerising ethylene and an alpha-olefinic comonomer having from 3 to 10 carbon atoms in the presence of a second catalyst under conditions which suppress residual activity in the first catalyst to produce a second polyethylene fraction; and
   (d) retrieving from the second reactor polyethylene comprising a blend of the first and second polyethylene fractions.

2. Process according to claim 1 wherein the second catalyst is a Ziegler-Natta catalyst.

3. Process according to claim 1, wherein the second catalyst is a metallocene catalyst.

4. Process according to claim 3, wherein the metallocene catalyst has been treated with an alumoxane.

5. Process according to claim 1 wherein the second catalyst is used together with a cocatalyst.

6. Process according to claim 5 wherein the cocatalyst is tri-isobutyl aluminium or triethylaluminium.

7. Process according to claim 1 wherein the second polyethylene fraction has a higher molecular weight than the first polyethylene fraction.

8. Process according to claim 1 wherein the temperature in the second reactor ranges from 65 to 80° C.

9. Process according to claim 1, wherein the chromium catalyst has been chemically reduced with carbon monoxide or methane.

10. Process according to claim 9, wherein the chemical reduction of the chromium catalyst is carried out at a temperature ranging from 250 to 500° C.

* * * * *